US012293315B2

(12) United States Patent
Swindells

(10) Patent No.: US 12,293,315 B2
(45) Date of Patent: May 6, 2025

(54) SYSTEM AND METHOD FOR LOAD BALANCING CARRIER DEVICES AMONG STATIONS IN A PACKING SYSTEM

(71) Applicant: Express Scripts Strategic Development, Inc., St. Louis, MO (US)

(72) Inventor: Scott Swindells, Chesterfield, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 219 days.

(21) Appl. No.: 17/973,829

(22) Filed: Oct. 26, 2022

(65) Prior Publication Data
US 2023/0126344 A1 Apr. 27, 2023

Related U.S. Application Data

(60) Provisional application No. 63/272,671, filed on Oct. 27, 2021.

(51) Int. Cl.
*G06Q 10/0631* (2023.01)
*G06Q 10/08* (2024.01)
(52) U.S. Cl.
CPC ....... *G06Q 10/06312* (2013.01); *G06Q 10/08* (2013.01)
(58) Field of Classification Search
CPC ............... B65G 65/00; B65G 1/1373; B65G 2201/0258; B65G 65/005; G06Q 10/087; G06Q 10/047; G06Q 10/08
See application file for complete search history.

(56) References Cited

U.S. PATENT DOCUMENTS

| | | | |
|---|---|---|---|
| 6,061,607 A * | 5/2000 | Bradley | B65G 1/1376 414/280 |
| 6,781,522 B2 | 8/2004 | Sleva | |
| 6,913,056 B2 | 7/2005 | Landherr | |
| 7,006,530 B2 | 2/2006 | Spinar | |
| 7,459,054 B2 | 12/2008 | Landherr | |
| 7,507,705 B2 | 3/2009 | Buschmann | |
| 8,146,642 B2 | 4/2012 | Landherr | |
| 8,263,650 B2 | 9/2012 | Cook | |

(Continued)

OTHER PUBLICATIONS

Ha, Yunsoo et al., Free balancing for a shuttle-based storage and retrieval system Simulation Modeling Practice and Theory, vol. 82, 2018 (Year: 2018).*

(Continued)

*Primary Examiner* — Scott L Jarrett
(74) *Attorney, Agent, or Firm* — The Small Patent Law Group

(57) ABSTRACT

A system and method for load balancing within a packing system may identify locations of carrier devices in the packing system based on optical communications between the carrier devices and route communication devices disposed at different locations along the routes of the packing system. The system and method can identify zones associated with different segments of the routes, determine whether a number and/or density of the carrier devices in a zone exceeds a threshold, and, responsive to the number and/or the density exceeding the threshold, (a) the carrier devices are directed to move to reduce the number and/or the density of the carrier devices and/or (b) the task performed by one or more of the task stations of the packing system is changed.

20 Claims, 5 Drawing Sheets

(56) References Cited

U.S. PATENT DOCUMENTS

| | | | |
|---|---|---|---|
| 8,281,312 B2 | 10/2012 | Gnanasambandam | |
| 8,326,679 B1* | 12/2012 | Rowe | G06Q 10/08 |
| | | | 705/28 |
| 8,327,609 B2* | 12/2012 | Krizmanic | B65G 1/1378 |
| | | | 53/473 |
| 8,417,550 B2 | 4/2013 | Gabrielson | |
| 8,504,413 B1* | 8/2013 | Rowe | G06Q 10/08 |
| | | | 705/28 |
| 8,521,327 B2 | 8/2013 | Pinney | |
| 8,571,702 B1* | 10/2013 | Haake | G06Q 10/047 |
| | | | 705/26.1 |
| 9,125,089 B2 | 9/2015 | Gopalasetty | |
| 9,150,119 B2 | 10/2015 | Henderson | |
| 9,179,321 B2 | 11/2015 | Hasarchi | |
| 9,220,154 B2 | 12/2015 | Dingemans | |
| 9,238,558 B2 | 1/2016 | Houck | |
| 9,271,896 B2 | 3/2016 | Clements | |
| 9,280,157 B2 | 3/2016 | Wurman | |
| 9,286,590 B2 | 3/2016 | Segawa | |
| 9,373,065 B1 | 6/2016 | Hoffman | |
| 9,409,201 B2 | 8/2016 | Summons | |
| 9,575,273 B2 | 2/2017 | Cabanne Lopez | |
| 9,586,008 B2 | 3/2017 | Shetty | |
| 9,592,343 B2 | 3/2017 | Shetty | |
| 9,597,454 B2 | 3/2017 | Wetzel | |
| 9,639,245 B2 | 5/2017 | Sang | |
| 9,649,303 B2 | 5/2017 | Penn | |
| 9,665,688 B2* | 5/2017 | Terzini | G16H 20/13 |
| 9,681,772 B2 | 6/2017 | Atilla | |
| 9,694,977 B2 | 7/2017 | Aprea | |
| 9,697,335 B2 | 7/2017 | Joplin | |
| 9,913,147 B2 | 3/2018 | Brighenti | |
| 9,944,419 B2 | 4/2018 | Joplin | |
| 9,978,036 B1 | 5/2018 | Eller | |
| 10,053,248 B2 | 8/2018 | Joplin | |
| 10,303,854 B2 | 5/2019 | Joplin | |
| 10,356,664 B2 | 7/2019 | Viger | |
| 10,492,223 B2 | 11/2019 | Lee | |
| 10,589,931 B2* | 3/2020 | Jarvis | B65G 1/1373 |
| 10,850,926 B2 | 3/2020 | Greyshock | |
| 10,674,538 B2 | 6/2020 | Li | |
| 10,702,451 B2 | 7/2020 | Lum | |
| 10,782,670 B2 | 9/2020 | Crivella | |
| 10,832,209 B2 | 11/2020 | Rajkhowa | |
| 11,465,849 B2* | 10/2022 | Yamashita | B65G 1/1378 |
| 11,820,543 B1* | 11/2023 | Hoffman | B65B 5/06 |
| 12,012,283 B1* | 6/2024 | Douglas | B65G 1/1378 |
| 2007/0198347 A1 | 8/2007 | Muldoon | |
| 2009/0037234 A1* | 2/2009 | Gabrielson | G06Q 50/18 |
| | | | 705/311 |
| 2011/0106673 A1 | 5/2011 | Shanley | |
| 2011/0243707 A1* | 10/2011 | Dumas | B65B 5/105 |
| | | | 700/259 |
| 2012/0097064 A1* | 4/2012 | Kussner | B65G 65/00 |
| | | | 104/29 |
| 2013/0173489 A1* | 7/2013 | Gabrielson | G06Q 10/083 |
| | | | 705/337 |
| 2015/0073052 A1 | 3/2015 | Cook | |
| 2016/0137433 A1* | 5/2016 | Tempany | B65G 57/035 |
| | | | 414/789.5 |
| 2016/0151246 A1 | 6/2016 | Sotelo | |
| 2016/0355340 A1* | 12/2016 | Meurer | B65G 1/1378 |
| 2018/0155133 A1* | 6/2018 | Harnesk | B65G 43/08 |
| 2018/0180429 A1 | 6/2018 | De Lorenzo | |
| 2018/0186572 A1* | 7/2018 | Issing | B65G 1/1375 |
| 2020/0204954 A1* | 6/2020 | Bertrand | G06Q 10/04 |
| 2021/0331821 A1* | 10/2021 | Nichols | B65B 5/06 |
| 2022/0119208 A1* | 4/2022 | Du | B07C 5/36 |
| 2023/0130332 A1* | 4/2023 | Swindells | G06Q 10/087 |
| | | | 705/28 |
| 2023/0133785 A1* | 5/2023 | Di Genova | B65B 65/003 |
| | | | 705/2 |
| 2023/0136001 A1 | 5/2023 | Di Genova | |
| 2023/0139860 A1 | 5/2023 | Di Genova | |

OTHER PUBLICATIONS

Roodbergen, Kess Jan et al., A survey of literature on automated storage and retrieval systems European Journal of Operational Research, Vo. 194, 2009 (Year: 2009).*

Beer, Jakob, Limitations of Shuttle Systems in Goods-to-Persons Picking Applications for eGrocery Beer-management.de, Mar. 12, 2021 (Year: 2021).*

Leijnse, N., Optimizing the workload allocation in an e-fulfillment center using queueing theory University of Twente, Mar. 2021 (Year: 2021).*

Le-Anh, Tuan et al., A review of design and control of automated guided vehicle systems European Journal of Operational Research, vol. 171, 2006 (Year: 2006).*

* cited by examiner

SYSTEM AND METHOD FOR LOAD BALANCING CARRIER DEVICES AMONG STATIONS IN A PACKING SYSTEM

CROSS-REFERENCE TO RELATED APPLICATIONS

This application claims priority to U.S. Provisional Application No. 63/272,671 (filed 27 Oct. 2021), the entire disclosure of which is incorporated herein by reference.

BACKGROUND

Products can be packed into packaging for a wide variety of goods. As one example, high volume pharmacies can pack medications for mail delivery for a wide variety of medications at high speeds and volumes. While some automated, high volume product packing systems and methods exist, these systems and methods may suffer from backups at various stops in the systems where tasks are performed. For example, a location where a robot or person loads product or ancillary components into a container may containers coming into the location faster than the tasks are being completed. A backlog or back up can result. A need may exist for a system and method that better manages the flow of equipment and products through packing systems to avoid or reduce the backlogs or backups that occur in some currently known packing systems.

BRIEF DESCRIPTION

In one example, a method for load balancing within a packing system that places products into containers carried by carrier devices moving along routes between task stations within the packing system is provided. The method may include identifying locations of the carrier devices in the packing system based on optical communications between the carrier devices and route communication devices disposed at different locations along the routes of the packing system, identifying zones associated with different segments of the routes in the packing system in which one or more of the carrier devices is disposed based on the locations that are identified, and determining whether a number and/or density of the carrier devices in one or more of the zones exceeds a threshold associated with the one or more zones. Responsive to determining that the number and/or the density of the carrier devices in the one or more zones exceeds the threshold, the method can also include (a) directing the carrier devices to move to reduce the number and/or the density of the carrier devices in the one or more zones to no more than the threshold of the one or more zones and/or (b) changing which task is performed by one or more of the task stations of the packing system.

In another example, a load balancing system for a packing system is provided. The load balancing system may include carrier devices that may carry containers in which products are placed, task stations that may perform different tasks involved in placing the products into the containers carried by the carrier devices, routes extending between the task stations and on which the carrier devices may move, and route communication devices disposed at different locations along the routes and that may optically communicate with the carrier devices. The load balancing system also may include a system controller that may identify locations of the carrier devices in the packing system based on optical communications between the carrier devices and the route communication devices, and identify zones associated with different segments of the routes in the packing system in which one or more of the carrier devices is disposed based on the locations that are identified. The system controller also may determine whether a number and/or density of the carrier devices in one or more of the zones exceeds a threshold associated with the one or more zones. Responsive to determining that the number and/or the density of the carrier devices in the one or more zones exceeds the threshold, the system controller may (a) direct the carrier devices to move to reduce the number and/or density of the carrier devices in the one or more zones to no more than the threshold of the one or more zones, and/or (b) change which task is performed by one or more of the task stations of the packing system.

The carrier devices, in an example embodiment, are configured to carry at least one of a plurality of medicines and are tracked to track the medicine on an individualized basis. The carrier devices may also move ancillary materials associated with the medicine moved by the carrier device.

BRIEF DESCRIPTION OF THE DRAWINGS

In the drawings, reference numbers may be reused to identify similar and/or identical elements.

DETAILED DESCRIPTION

Figure 1:
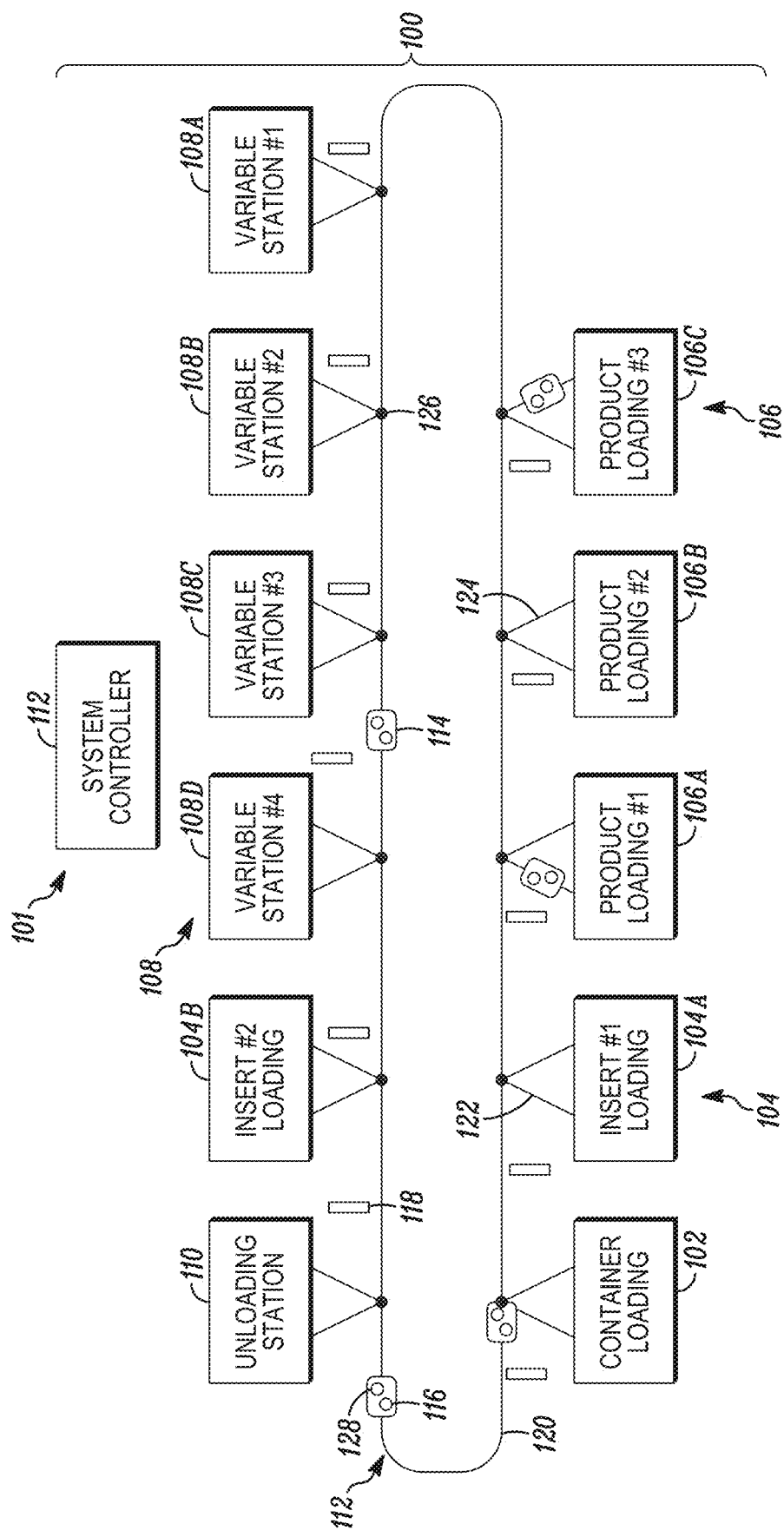
FIG. 1 illustrates one example of a packing system having a load balancing system.

The subject matter described herein provides a load balancing system and method that can monitor locations and movements of carrier devices moving through a packing system where containers are carried by or on the carrier devices, and one or more products (which can include medicines and ancillary materials associated with the medicine) and/or packaging materials are inserted into the containers before closing and shipping the containers (e.g., to customers, patients, etc.). Using these monitored locations and movements, the load balancing system and method can change where the carrier devices are moving within the packing system to reduce backlogs or backups, and increase or maintain throughput of the containers through and out of the packing system. While one or more examples of the inventive subject matter is described in connection with the packing and inspection of medications, such as narcotics or other restricted drugs or medications, not all embodiments of the inventive subject matter is limited or restricted to the packing and inspection of medications. One or more embodiments may relate to the packing of other products (e.g., materials that are ancillary and related to the medicine or other main product being fulfilled by the presently described system) that may or may not require manual inspection.

The packing system can include several shuttle devices (also referred to as carrier devices) that carry containers, products, etc. between different stations within the packing system. Each station may be active or inactive, and each station may be in a different work category based on the task that is performed at that station. The shuttle devices, in some example embodiments, can be the shuttle devices described in U.S. patent application Ser. No. 17/513,600, filed 28 Oct. 2021, which is hereby incorporated by reference herein. One or more, or each, of the stations may switch work categories so that different tasks may be performed at the same station, but during different time periods. For example, some stations may be automated stations where the task(s) performed at those stations is or are automatically performed by machines (e.g., robots, such as pick-and-place robots), while other stations may be manual stations where the task(s) performed at those stations is or are manually performed by people. The different work categories can vary depending on the product being packaged, but in one example, can include picking and placing packaging and/or the product into a container (referred to as a pick task), quality review of the product and packaging that has been placed into a container (e.g., by the pick task), fixing or correcting the packaging or product that was incorrectly placed into the container (e.g., which may have been flagged as erroneous during the quality review), or the like. The packaging can include placing cardboard or filler material to protect the product during shipping, placing cooling packs or the like in the container, etc. One or more stations may be inactive, or bypass, stations, meaning that no task is performed at that station.

The packing system can include routes that extend between the stations. These routes can be provided by rails on which the carrier devices move, conveyors that move the carrier devices, or the like. The packing system can have a system controller that controls or directs which tasks are performed by the different stations at different times. The system controller also can direct the carrier devices to move to different stations as tasks are completed. The carrier devices may include local controllers that control communication between the carrier devices and the system controller, and that control movement (e.g., by control of one or more motors) to move the carrier devices according to the instructions received from the system controller. In one embodiment, the system controller determines a category of station to which a carrier device is to move next for completion of the packing of the product(s) in the container carried by or on the carrier device.

For example, the system controller may direct a carrier device that the carrier device is to next move to a pick station (where the station will automatically or manually pick up and place packaging and/or product in a container), a correction or re-work station (where the station will automatically or manually remove extra or extraneous material erroneously placed into the container, an inspection station (where the contents of the container is manually or automatically inspected), or the like. The carrier devices may then move along the route(s) of the packing system to another station, communicate with the system controller to determine where to move next, and move according to the received instructions. If there are too many other carrier devices waiting at a station, the system controller can direct the carrier device to another station that has fewer other carrier devices waiting. If there are not too many other carrier devices waiting, the carrier device can enter into the next station where the task is performed. The carrier device may then receive another route indicator and move to another station, or may exit the packing system for delivery to a customer or patient.

This packing system and method can allow for the task category assigned to various stations to be quickly and easily changed, which permits the packing system to be easily scalable and modifiable to address backlogs at stations. For example, some stations may manually perform the pick task, inspection task, and/or correction or re-work task. The system controller can change how many of these manual stations are performing different tasks to ensure that the throughput of the packing system (e.g., the rate at which products are correctly packaged and output from the packing system) remains high, while allowing for some manual inspection of some products.

The load balancing system and method can track physical locations of the carrier devices (also referred to as shuttles or shuttle devices) within the packing system. The packing system may be logically arranged, organized, or otherwise divided into separate zones or areas, and movement of the carrier devices between these zones (or across boundaries separating the zones) can be tracked. The zones may be non-overlapping zones in one embodiment, or two or more zones may partially overlap each other. In an example embodiment, the variable stations define distinct zones. In an example embodiment, the track routes intermediate the variable stations define distinct zones. The load balancing system can determine how many carrier devices are in each zone, which carrier devices are in each zone, whether any carrier devices have been removed from the packing system, how long the carrier devices have been removed from the packing system, which carrier devices have been removed from the packing system, which previously removed carrier devices have been placed back into the packing system, and the like. Using some or all of this information, the load balancing system can dynamically route (e.g., direct movements of) the carrier devices to different locations among or within the zones for balancing the workload of stations in the different zones, for keeping a density of carrier devices within zones to below a threshold density, etc. This can help increase or maintain the throughput of tasks and carrier devices through the packing system.

FIG. 1 illustrates one example of a packing system 100 having a load balancing system 101. The packing system includes several stations 102, 104, 106, 108, 110 interconnected with each other by carrier routes 112. Several carrier devices 114 may move along the routes to and/or between the stations. More or fewer stations and/or carrier devices can be provided. Different tasks can be performed by the stations other than what is described or illustrated herein. The carrier devices can include or represent platforms or containers on which other containers are placed with packing and products placed into the container before the container is closed and readied for shipping.

In the illustrated example, the station 102 ("Container Loading" in FIG. 1) is referred to as a container loading station where containers (e.g., a box, bag, or the like) are placed onto or into the carrier devices. The containers may be placed onto or into the carrier devices by robotic equipment included in the container loading station. Alternatively, the containers may be manually placed onto or into the carrier devices. The stations 104 ("Insert #1 Loading" and "Insert #2 Loading" in FIG. 1) are insert loading stations that can include a first insert loading station 104A and a second insert loading station 104B. These insert loading stations can place packaging material, such as cardboard supports or components that protect the product (e.g., medication), etc., in the container, by robotic equipment included in the stations.

The stations 106 ("Product Loading #1," "Product Loading #2," and "Product Loading #3" in FIG. 1) are product loading stations that can include first, second, and third product loading stations 106A, 106B, 106C. These product loading stations can place a product (e.g., a container of medication) into the container on the carrier device that is in the corresponding station, by robotic equipment included in the stations.

The stations 108 ("Variable Station #1," "Variable Station #2," "Variable Station #3," and "Variable Station #4" in FIG. 1) are variable stations that can include first, second, third, and fourth variable stations 108A, 108B, 108C, 108D. These variable stations can perform a variety of tasks, such as inspection or quality control of the tasks performed by other stations; placement of literature into the container (e.g., medication instructions), placement of ancillary devices such as syringes, dosing vials, medication, etc. (for help in administering the medication to the patient), literature (e.g., medication dosing instructions and/or warnings), etc.; the picking and placing of containers, packaging, inserts, product, ancillary devices, or the like; the correction of any containers having incorrect inserts, packaging, inserts, product, ancillary devices, etc.; or another task. As described herein, a system controller 112 can change which tasks are performed by the variable stations to keep up with demand, reduce bottlenecks or backlogs at other stations, provide for manual or in-depth automatic inspection of a packaged container, or the like. The tasks performed at the variable stations can be performed manually by one or more persons. Alternatively, the variable stations may include robotic equipment that automatically performs the tasks at these stations.

The station 110 ("Unloading Station" in FIG. 1) is an unloading station where the container on or in a carrier device is removed from the packing system. For example, after a container is correctly filled with the packaging, optional inserts, product(s), etc. and approved through inspection, the container can be removed from the carrier device at the unloading station. The container may then be sent for shipping or other delivery to a customer.

The carrier devices can include one or more motors to self-propel the carrier devices along the routes. For example, in one embodiment, the carrier devices include motors to move themselves along the routes. In another embodiment, the carrier devices may be pulled or pushed by one or more chains, ropes, cables, conveyor belts, etc. The carrier devices also can include device controllers 116 that communicate with the system controller via route communication devices 118 at various locations within the packing system. There may be many more or fewer route communication devices in the packing system than what is shown in FIG. 1. Additionally, one or more of the stations can each include one or more internal communication devices in the station(s), as described below. In one embodiment, there is a route communication device that is both upstream of one station and downstream from a prior station (along the loops of the routes) for each of the stations, as shown in FIG. 1.

The system controller and the device controllers each can represent hardware circuitry that includes and/or is connected with a processor or more than one processor (e.g., one or more microcontrollers, integrated circuits, field programmable gate arrays, microprocessors, etc.) that perform the operations described in connection with the respective system controller or device controllers. The system controller can be connected (via wired and/or wireless connections) with the route communication devices that are off-board the carrier devices. The device controllers optionally can include or be connected with one or more carrier communication devices 128 that are onboard the carrier devices to enable the device controllers to communicate with the system controller via the carrier communication devices and the route communication devices. The load balancing system may include the system controller and the communication devices (both route and carrier communication devices). The communication can be electrical signal communication, wired or wireless.

The route communication devices and carrier communication devices may optically communicate information. For example, the communication devices may communicate using infrared light, visible light, or the like. Alternatively, the communication devices may communicate information with the device controllers via other wireless and/or wireless connections, such as electromagnetic waves, signals conducted along cables or wires, etc. Using optical communications, however, can reduce or eliminate the interference that may otherwise occur with other wireless communications. For example, the optical communications can rely on line-of-sight between the communication devices, which can limit communication with each off-board communication device to only a single carrier device at a time.

The routes can extend among and/or between the stations in one or more loops 120 and include off-ramps 122 and on-ramps 124 between the loops and the stations. The routes include switches 126 at intersections between the loops and the off-ramps and between the loops and the on-ramps. The switches are controlled by the system controller to direct carrier devices from the loop to the station via an off-ramp, to direct carrier devices from the station to the loop via an on-ramp, and/or to direct the carrier devices to remain on the loop and bypass a station. For example, each switch can have different states or positions: an incoming state where the switch connects the loop with an off-ramp to lead the carrier device into the station, an outbound state where the switch connects the loop with an on-ramp to lead the carrier device out of the station and back to the loop, and a bypass state where the switch keeps the carrier device on the loop and prevents the carrier device from moving onto an off-ramp to a station. The carrier devices may include internal motors that allow the carrier devices to self-propel along the routes as dictated by the states of the switches, which are controlled by the system controller.

The system controller can change which stations are active and which are inactive by communicating with the stations and/or the carrier devices. For example, the system controller can communicate an active indicator to the switches and/or carrier devices that indicate that a station is active (where the station is operational to perform the assigned task). The system controller can communicate indicators to the switches that instructs the switches to change to designated or indicated states or positions. The system controller can communicate indicators to the carrier devices that instruct the carrier devices to move to locations (e.g., switches, stations, communication devices, etc.) identified in the indicators. The indicators can be machine readable signals. Upon receiving such communication indicating that a station is inactive, the switch can change to the bypass state to prevent the carrier devices from moving into an inactive station and/or the carrier device can stay on the loop part of the routes to bypass the inactive station(s).

The system controller can change what task is being performed by one or more of the stations. For example, the system controller can direct the first variable station to perform the pick task (where product, ancillary devices, packaging, etc. is placed into the container on or in the carrier device), the second variable station to perform the correction or re-work task (where a missing or incorrect product, ancillary device, packaging, etc., is removed or placed into the container), the third variable station to perform the inspection task (where the contents of the container in or on a carrier device are inspected), and the fourth variable station to be inactive. The system controller can later change the second variable station to perform the pick task and the fourth variable station to perform the inspection task. The tasks performed by these stations can be manually changed as needed based on operator input to the system controller. For example, if too many (e.g., more than a threshold number) of carrier devices are waiting in line for a pick station and/or carrier devices are waiting too long (e.g., longer than a threshold period of time) to have a task performed by a station, then an operator can provide input to the system controller that changes which tasks are performed by the variable stations to reduce the number of carrier devices waiting for a task. Alternatively, the tasks performed by these stations can be automatically changed as needed by the system controller. For example, if too many of carrier devices are waiting in line for a pick station and/or carrier devices are waiting too long to have a task performed by a station, then the system controller can change which tasks are performed by the variable stations to reduce the number of carrier devices waiting for a task.

Figure 2:
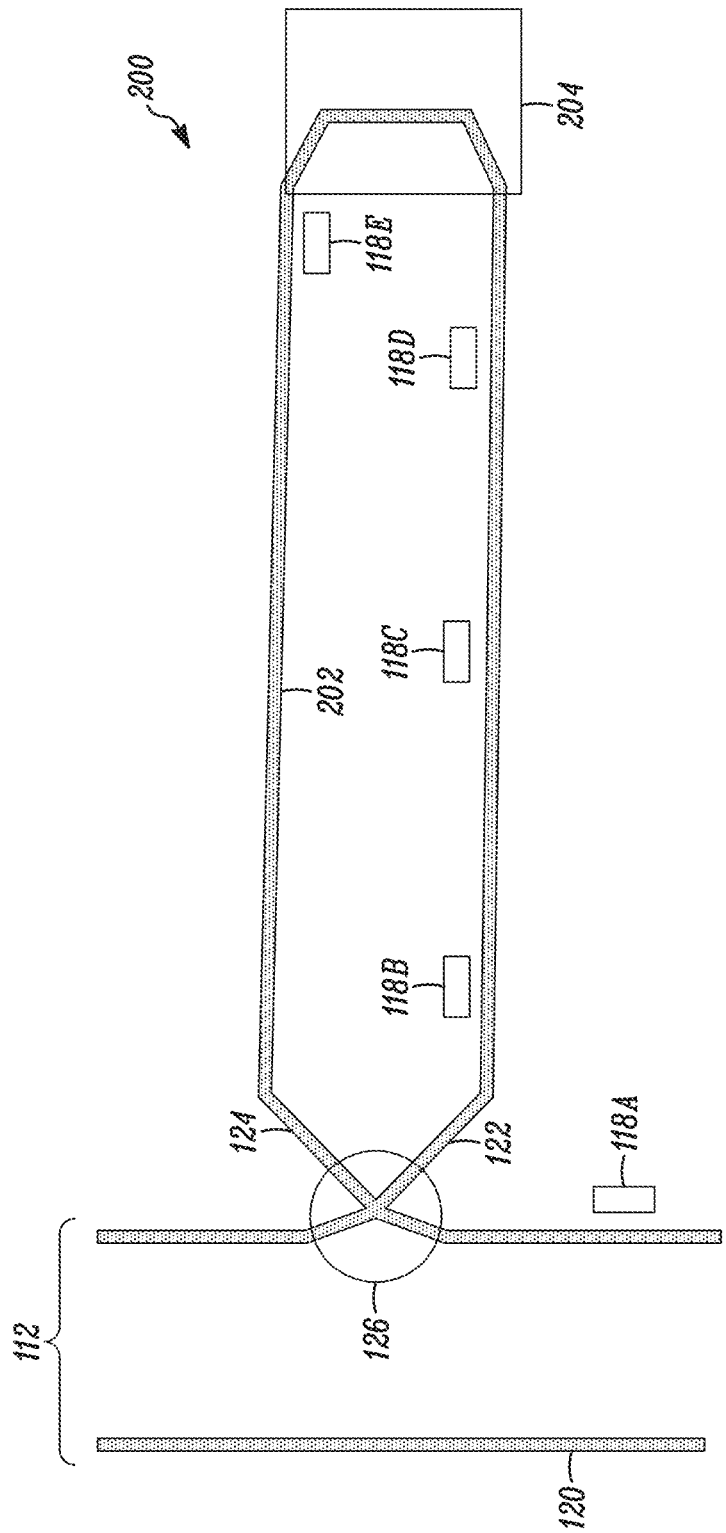
FIG. 2 illustrates an example of a task station that represents at least one of the stations shown in FIG. 1.

FIG. 2 illustrates an example of a station 200 that represents at least one of the stations shown in FIG. 1. The station includes an internal loop 202 of the routes 120 of the packing system. This internal loop is coupled with the loop 112 of the routes by the on-ramp 124 and off-ramp 122 described above. The layout of the internal loop of the routes may differ from what is shown in FIG. 2 and is provided merely as one example.

The station includes a task location 204 disposed along and/or through which the internal loop passes. This task location can represent robotic machinery that includes one or more pick-and-place robots that can pick up products, packaging, ancillary devices or components, etc. and place the products, packaging, ancillary devices or components, etc. into a container carried on or in the carrier device as the carrier device stops at the robotic machinery or passes by the task location (e.g., to complete the task assigned to the station by the system controller). Alternatively, the work location can represent a table or other object at which one or more persons may stand for inspecting the contents of a container, pick and place objects in the container, etc. (e.g., to complete the task assigned to the station by the system controller).

As shown, several more route communication devices 118 may be disposed at different locations in the station alongside the internal loop. There may be more or fewer route communication devices than shown in FIG. 2. In the illustrated example, there is a first route communication device 118A outside of the station and upstream of the switch 126 (along a direction of travel of the carrier devices through the routes, and also shown in FIG. 1), a second route communication device 118B in the station and downstream of the same switch, a third route communication device 118C downstream of the second communication device upstream of the work location, a fourth route communication device 118D downstream of the third route communication device and the work location, and a fifth route communication device 118E downstream of the work location and upstream of the switch.

The system controller can determine where different carrier devices are based on communications between the carrier devices and the system controller via the differently placed route communication devices. For example, each carrier device may be associated with identifying information, such as a unique identification that is only associated with a single communication device. The carrier communication device of each carrier device may communicate with the route communication devices as the carrier device moves by the route communication devices. In one embodiment, the device controller stops movement of the carrier device as the carrier device reaches a route communication device (e.g., has the carrier communication device in a position where a line of sight or communication pathway is present between the carrier communication device and the route communication device). The route communication device and carrier communication device can communicate with each other while the carrier device is stopped or stationary. Alternatively, the device controller does not stop movement of the carrier device as the carrier device passes a route communication device, and the route communication device and carrier communication device can communicate with each other while the carrier device moves by the route communication device.

The identifying information of the carrier device is communicated to the system controller via the communication devices. The system controller is aware of the location of each route communication devices, so receipt of a signal from a route communication device containing identifying information of a carrier device indicates where the carrier device is located within the packing system.

Figure 3:
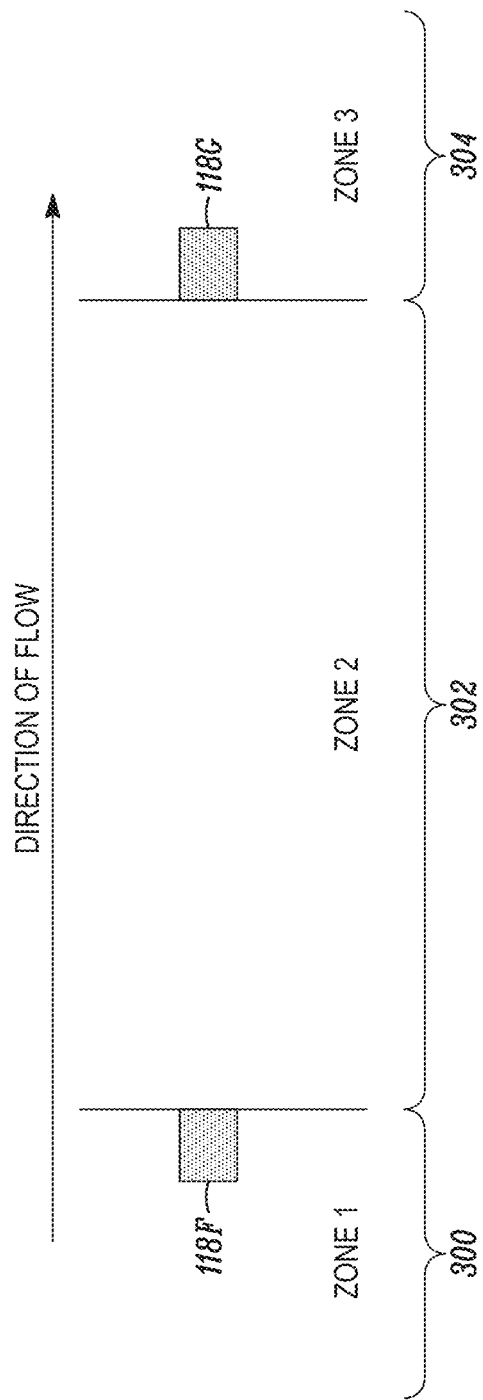
FIG. 3 illustrates one example of division of the packing system into different zones or areas.

FIG. 3 illustrates one example of division of the packing system into different zones or areas 300, 302, 304. The carrier devices move by the route communication devices 118F, 118G along the routes, as described above. The route communication devices shown in FIG. 3 can represent any two of the route communication devices in the packing system in one embodiment. The system controller may logically divide different segments of the routes into the different zones or areas based on the locations of the route communication devices. While only three zones are shown in FIG. 3, the packing system may have many more zones.

For example, a first zone 300 may extend along the routes and end at the route communication device 118F along the direction of flow or movement of the carrier devices along the routes. As shown, the first zone ends downstream of the route communication device 118F such that the route communication device 118F is inside the first zone. A third zone 304 begins upstream of the route communication device 118G and continues along the direction of flow or movement of the carrier devices along the routes. The route communication device 118G may be inside the third zone. A second zone 302 extends from a location downstream of the route communication device 118F and ends upstream of the route communication device 118G. The second zone may not include any route communication devices. The first zone may begin downstream of another communication device (not shown in FIG. 3 but may be shown in FIGS. 1 and/or 2). The third zone may extend to a location upstream of another communication device (not shown in FIG. 3 but may be shown in FIGS. 1 and/or 2). This pattern of zones can be repeated along the length of the track defining the routes to be traveled by the carriers.

The switches along the routes may provide additional boundaries to different zones. For example, one or both the route communication devices 118F, 118G shown in FIG. 3 may represent a switch shown in FIGS. 1 and 2. The switch(es) can be disposed at the upstream beginning and/or downstream end of a zone, as described above.

The system controller of the load balancing system may logically or virtually divide different segments of the routes in the packing system (including within the stations) into different zones throughout the packing system and stations similar to as shown in FIG. 3. Based on which route communication device communicates with which carrier device and/or which switch has a state or condition change, the system controller of the load balancing system can determine which carrier devices are in which zones.

A carrier device that communicates with the system controller via a route communication device is identified by the system controller as transferring from one upstream zone to another downstream zone. In the example of FIG. 3, a carrier device that communicates with the system controller via the communication device 118F is identified by the system controller as leaving the first zone 300 and entering or transferring to the second zone 302. This transition between zones may be identified without use of cameras or other sensors but may be identified based on the unidirectional travel of the carrier devices and the known locations of the route communication devices. Similarly, the system controller can determine when the carrier device leaves the second zone and enters the third zone responsive to the carrier device communicating with the communication device 118G.

Additionally or alternatively, a carrier device that communicates with the system controller via a route communication device to transfer a state or condition of a switch is identified by the system controller as transferring from one upstream zone to another downstream zone. As described above, the state of a switch may change based on whether the carrier device is to enter into a station to have a task performed. The system controller can determine which zone the carrier device is in based on communication with a route communication device (described above) and/or based on a change in state of a switch. For example, responsive to the system controller changing the state of a switch, the system controller can determine that the carrier device has exited one zone and entered a downstream zone.

As shown in FIGS. 1 and 2, the route communication devices throughout the packing system and within the stations can help the system controller to track how many carrier devices are in each zone. More than one carrier device may be inside a zone in one embodiment. For example, if the system controller determines that three carrier devices have communicated with the route communication device 118C but that one of these same three carrier devices have communicated with the route communication device 118D, then the system controller can determine that the three carrier devices are in a zone that includes the segment of the routes between the communication devices 118C, 118D. In this way, the system controller can be aware of how many carrier devices are in line or a queue for a task to be completed within a station, how may carrier devices are outside of stations (and where the carrier devices are located), etc. The system controller may assign a different limits on the number of carrier devices allowed in different zones. The number of carriers in a zone may depend on whether the zone is in a travel zone or a work zone, which can be a loop from a travel zone, whether the work being performed in a zone can allow the carrier devices to exit the zone in a timely manner in view of the carrier devices upstream in the system; the length of the zone, or similar limits of a zone.

The system controller can monitor how many carrier devices are in each zone and control the switches and information communicated to the carrier devices to avoid a density of the carrier devices in a zone exceeding a density threshold. The density of the carrier devices can be a number of the carrier devices within a zone, a number of carrier devices per unit length of the segment of the route in the zone, or the like. Alternatively, the system controller can monitor how many carrier devices are in each zone and control the switches and information communicated to the carrier devices to avoid a number or count of the carrier devices in a zone exceeding a density threshold.

If the number or density of carrier devices within the internal route loop of a station exceeds a threshold, then the system controller can communicate with other carrier devices that approach the station to inform the other carrier devices of the number of carrier devices waiting in the station. As described above, one or more of these other carrier devices may bypass the station to try and enter another station having fewer carrier devices in queue. The system controller also can change the task performed by one or more of the variable loading stations to a first task responsive to the number or density of carrier devices waiting to enter a station performing the first task becoming too large. Stated differently, the system controller can increase the number of stations performing the same task responsive to the number or density of carrier devices waiting for that task at another station exceeding a threshold. The system controller optionally can communicate with the carrier devices to instruct the carrier devices to remain stationary and not enter into another downstream zone responsive to the number or density of the carrier devices already in the downstream zone exceeding a threshold. Once the number or density of carrier devices in a station or downstream zone decreases to no more than the threshold, the system controller can communicate with carrier devices in one or more upstream zones to allow the carrier devices in the upstream zone(s) to move into the downstream zone or station.

Figure 4:
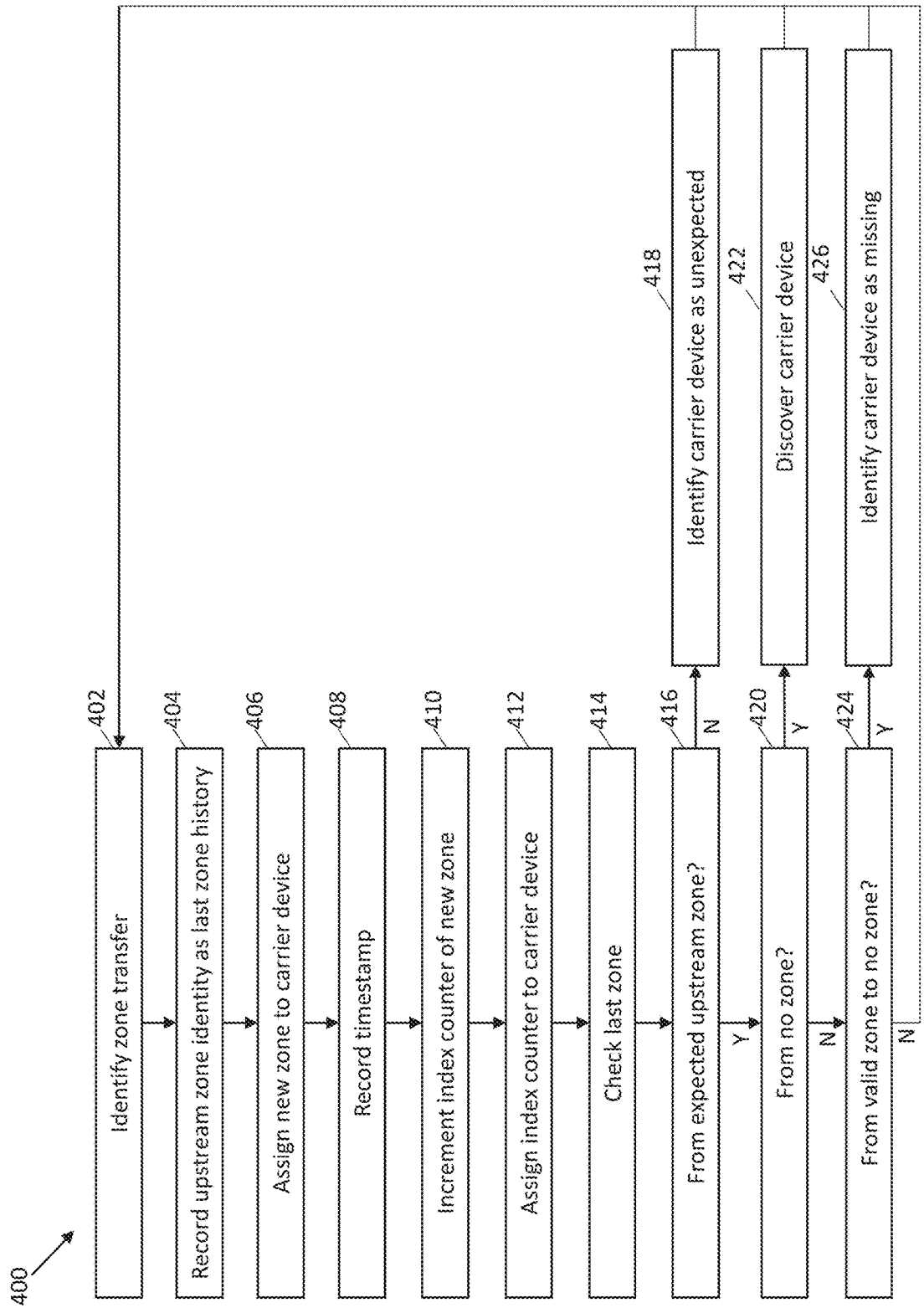
FIG. 4 illustrates a flowchart of one example of a first method for tracking carrier devices within a packing system.

FIG. 4 illustrates a flowchart of one example of a first method 400 for tracking carrier devices within a packing system. The first method can represent operations performed by the system controller of the load balancing system shown in FIG. 1. At 402, a zone transfer of a carrier device is identified. This transfer may be identified responsive to the carrier device communicating with the system controller via a communication device located at or near a boundary of a zone. For example, the transfer can be identified responsive to the carrier device communicating via the route communication device that is at a boundary of a zone or a route communication device that is not at the boundary of a zone but that is the last route communication device in a zone (along the direction of movement) or that is the first route communication device in a zone (along the direction of movement).

At 404, an identity of the upstream zone is recorded as a last zone history for the carrier device. For example, the system controller can include or be able to communication with a tangible and non-transitory computer readable storage medium, such as a computer memory. The system controller can record prior and current zones that each carrier device was and is disposed within. Alternatively, the system controller can record only the prior or current zone of the carrier device, with the system controller being able to determine which zone the carrier device is in based on the unidirectional flow of movement within the packing system described above. The system controller can store the prior zone of the carrier device as the last zone history (or add the prior zone to a cumulative list of prior zones as the last zone history).

At 406, a new zone is assigned to the carrier device. The system controller can assign the identity of the current zone or the zone that the carrier device transferred to as the new zone. This can be recorded in the memory described above.

At 408, a timestamp representing the time that the carrier device entered a new zone can be recorded. For example, the system controller can record the time at which the carrier device entered a different zone, the carrier device exited a prior zone, or the carrier device made a communication with a communication device indicating a zone transfer. This time can be recorded in the memory described above. The timestamp may be associated with the carrier device and/or the current zone recorded for the carrier device.

At 412, an index counter is assigned to the carrier device. The index counter may be a timer that is used by the system controller to monitor how long the carrier device is within the same zone. The system controller may track this timer and associate the time in the zone with the carrier device in the memory. At 414, the last zone of the carrier device is checked. The last zone of the carrier device can be checked by the system controller examining the last zone history of the carrier device in the memory and identifying the prior zone that the carrier device transferred out of as the last zone.

At 416, a decision is made as to whether the last zone of the carrier device is an expected upstream zone. As described above, the carrier devices may move through the packing system in a single direction through the loop and one or more internal loops of the stations. This direction may be clockwise or counter-clockwise through the loop and clockwise or counter-clockwise in each station. The order or sequence of the zones through the packing system along this single direction can be stored in the memory. In the example shown in FIG. 3, this order may be the first zone 300 is first in the order, the second zone 302 is second in the order, and the third zone 304 is third in the order.

The system controller can examine the current zone of the carrier device and identify the adjacent zone upstream from the current zone based on the stored order of the zone. The system controller also can examine the last zone of the carrier device as stored in the memory (and determined and/or recorded at 404) and compare this last zone from the memory with the adjacent zone upstream from the current zone based on the stored order. If these two zones are the same zone, then the last zone of the carrier device is identified as an expected upstream zone. This can indicate that the carrier device is proceeding as expected through the zones as indicated in the order of the zones. Flow of the first method can then proceed toward 420.

But if these two zones are not the same zone, then the last zone of the carrier device is not identified as an expected upstream zone. This can indicate that the carrier device is not proceeding as expected through the zones as indicated in the order of zones. As a result, flow of the first method can proceed toward 418.

At 418, the carrier device is identified as unexpected. The system controller can store data in the memory to indicate that the carrier device is not expected in the current zone. This may indicate an error with the carrier device and/or one or more switches, an error by the system controller, or the like. Responsive to identifying a carrier device as unexpected, flow of the first method can terminate or return to a prior operation (e.g., 402). For example, the movement of the unexpected carrier device through the zones can continue to be tracked.

At 420, a decision is made as to whether the last zone of the carrier device is not any zone in the packing system. For example, the carrier device may have been identified as being in a new zone (at 406) for a tracked time period (at 410, 412) that is longer than expected (e.g., longer than a threshold time period). This may indicate that the carrier device was removed from the routes, or another issue is preventing the carrier device from leaving the zone.

If the prior zone stored in the history of the carrier device is not any zone or is stored as "no zone," then flow of the method can proceed toward 422 where the carrier device may be identified as a discovered or newly discovered carrier device in the packing system. Flow of the first method can then return toward 420. If the prior zone stored in the history of the carrier device is the same as the expected zone based on the order of zones, then the carrier device can be identified as progressing as expected through the zones in the order of the zones. Flow of the first method can proceed toward 424.

At 424, a decision is made as to whether the carrier device is moving or has moved from a valid zone to "no zone" (the carrier device is not moving toward an identified zone). If the carrier device has moved in this manner, then flow of the method can proceed toward 426, where the carrier device is identified as a missing carrier device. Flow of the method can then terminate or return to another operation (e.g., 402).

Figure 5:
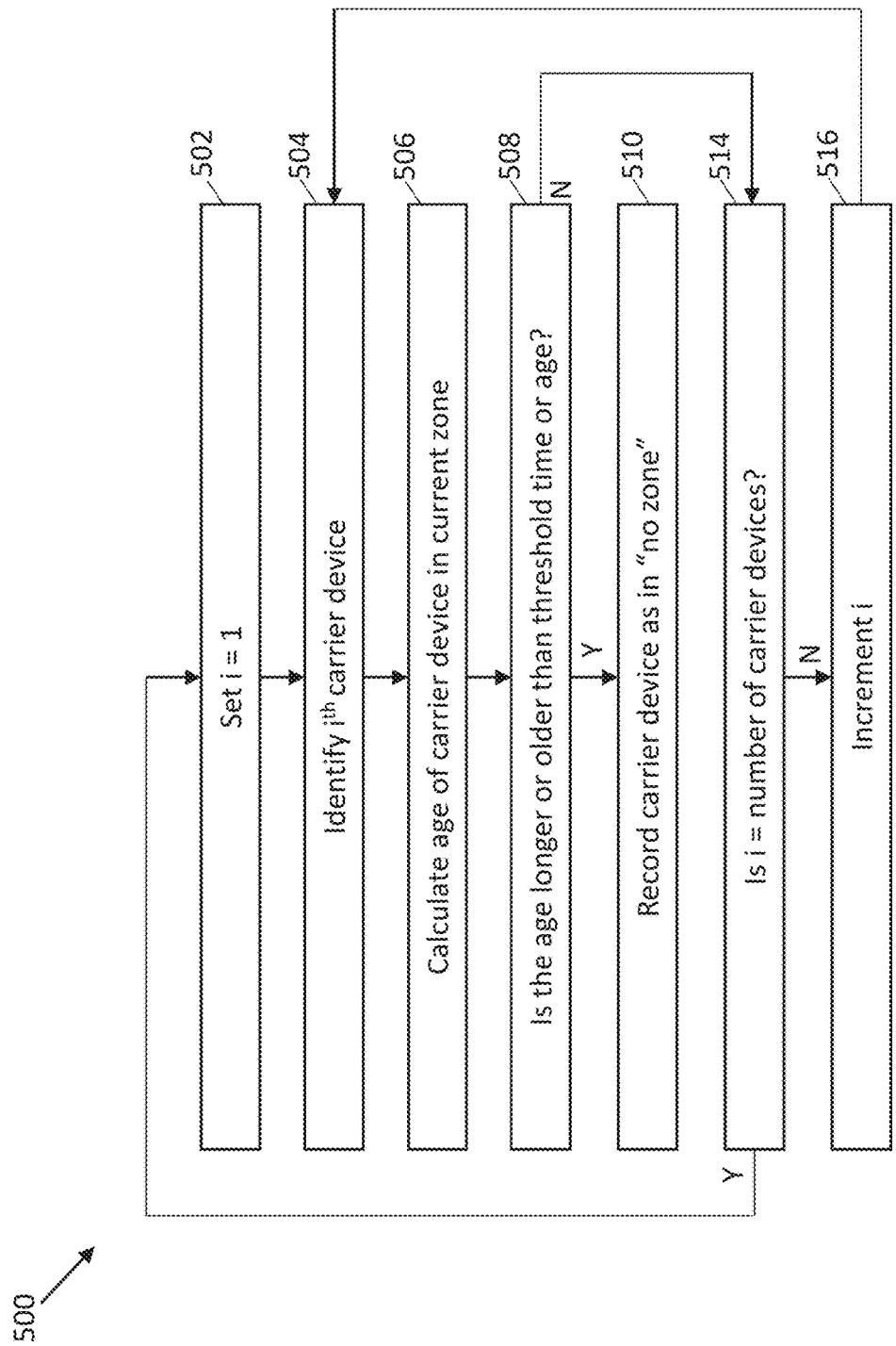
FIG. 5 illustrates a flowchart of an example of a second method for tracking carrier devices within a packing system.

FIG. 5 illustrates a flowchart of an example of a second method 500 for tracking carrier devices within a packing system. The second method can represent operations performed by the system controller in determining whether a carrier device is in the "no zone" described above.

At 502, a carrier counter is set to a value of one. For example, a variable i having a value that represents one of several or all carrier devices in the packing system is set to an initial value, such as one. Alternatively, this carrier counter may be set to the first identification of a carrier device in a group of carrier devices in the packing system, with the carrier counter incremented between a sequential order of the identifications of the carrier device. This carrier counter can be stored and updated by the system controller (e.g., in the memory).

At 504, the carrier device associated with the current value of the carrier counter is identified.

At 506, the age of the carrier device identified at 504 is determined. The age of the carrier device can be determined by calculating how long the carrier device has been in the current zone. This can be represented by the index counter described above or can be calculated using a timer of the system controller. At 508, a decision is made as to whether the age of the carrier device in the current zone exceeds a threshold time or age. The system controller can compare how long the carrier device has been in the current zone with a threshold period of time. If the carrier device has been in the current zone for longer than this threshold, then the carrier device may have been removed from the segment of the route associated with the current zone. For example, an operator or maintainer of the packing system may have manually removed the carrier device from the routes. As another example, there may be a communication error or other error of the carrier device. Flow of the second method can proceed toward 510.

At 510, the carrier device is identified as being in the "no zone." The system controller can record data indicating that the carrier device has been removed from the packing system, has an error, or is otherwise in none of the zones. But if the carrier device has not been in the current zone for longer than the threshold (determined at 508), then the carrier device may not be identified as being removed or having an error. As a result, flow of the second method can proceed from 508 toward 514.

At 514, a decision is made as to whether the carrier counter is at the last carrier device. For example, flow of the second method may be repeated two or more times, with each cycle of the second method examining the age of another carrier device. The carrier counter is tracked and incremented (described below) to sequentially determine the age that each carrier has been in the zone and whether this age is longer than a threshold, as described above. If the counter is at the last carrier device, then the second method may terminate or may return to a prior operation (e.g., 502) to repeat the process for the carrier devices. As a result, flow of the second method can terminate or return to 502. If the counter is not at the last carrier device, then the carrier counter value may be increased (e.g., incremented) at 516. The second method can then terminate or return to a prior operation (e.g., 502).

Another example of a method provided by this disclosure includes a method for load balancing within a packing system. The method can include identifying locations of the carrier devices in the packing system based on optical communications (e.g., flashing lights, infrared communications, etc.) between the carrier devices and the route communication devices disposed at different locations along the routes of the packing system. The method also can include identifying one or more non-overlapping spatial zones that each encompasses non-overlapping segments of the routes in the packing system in which one or more of the carrier devices is disposed. The method can include determining whether the number or density of the carrier devices in one or more of the zones exceeds a threshold number or threshold density associated with the one or more zones. Different zones may have different thresholds, two or more of the zones may have the same threshold but different from one or more other zones, or each zone may have a different threshold. If the number or density of carrier devices in a zone exceeds the threshold associated with the zone, the method can include directing the carrier devices to move (to enter or exit one or more zones) to reduce the number or density of carrier devices in the zone to no more than the threshold of that zone. Optionally, if the number or density of carrier devices in a zone exceeds the threshold associated with the zone, the method can include changing which task is performed by one or more stations within and/or outside of the one or more zones to reduce the number or density of carrier devices in the zone to no more than the threshold of that zone. The method can be repeated one or more times.

The present disclosure may be used in a medication filling systems described in U.S. Patent Application No. 63/272,925, filed 28 Oct. 2021, hereby incorporated by reference herein. If this incorporated document conflicts with the present disclosure, the present disclosure controls interpretation.

In some example embodiments described herein, the carrier devices move independently of each other, e.g., the carrier devices move a single order or part of an order through the fulfillment center. Accordingly, each carrier device can be tracked such that embodiments of the presently described systems and methods can provide load balancing therein. The tracking of the location within a fulfillment center, e.g., a pharmacy, that places products into containers carried by carrier devices allows the system to set up the configurable task stations and configure the track within the packing system.

The present disclosure uses the term message and/or signal for describing communication over a secondary communication channel to and from the provider devices. In an example embodiment, the message is not an audio signal. In an example embodiment, the message is not a video signal. Messages can be SMS text messages in an example embodiment. The messages can be packets including a header (including sender device and recipient device identification data) and a body of data. The use of a packet for communication on the second channel can allow for the packet to require less bandwidth to route the information to and from the provider device. Routing the packets can use internet protocol (e.g., IPv4, IPV6 and the like) to transmit the packets. The packet replies from the provider device can be a selection reply, e.g., a single character, that in and of itself does not provide any protected or sensitive information and can be interpreted by the telehealth system.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, present disclosure may lie in less than all features of a single disclosed embodiment. Thus, the following claims are hereby incorporated into the Detailed Description, with each claim standing on its own as a separate embodiment.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims is intended to be a means-plus-function element within the meaning of 35 U.S.C. § 112(f) unless an element is expressly recited using the phrase "means for," or in the case of a method claim using the phrases "operation for" or "step for."

The methods described herein do not have to be executed in the order described, or in any particular order. Moreover, various activities described with respect to the methods identified herein can be executed in serial or parallel fashion. Although "End" blocks may be shown in the flowcharts, the methods may be performed continuously.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, present disclosure may lie in less than all features of a single disclosed embodiment. Thus, the following claims are hereby incorporated into the Detailed Description, with each claim standing on its own as a separate embodiment.

What is claimed is:

1. A load balancing system for a pharmaceutical packing system, the load balancing system comprising:
carrier devices configured to carry containers in which pharmaceutical products are placed;
task stations configured to perform different tasks involved in placing the products into the containers carried by the carrier devices;
tracks extending between the task stations in loops and on which the carrier devices are configured to move;
route communication devices disposed at different locations along the routes and configured to optically communicate with the carrier devices; and
a system controller configured to identify locations of the carrier devices in the packing system based on communications between the carrier devices and the route communication devices, the system controller configured to identify zones associated with different segments of the routes in the packing system in which one or more of the carrier devices is disposed based on the locations that are identified, the system controller configured to determine whether one or more of a number or density of the carrier devices in one or more of the zones exceeds a threshold associated with the one or more zones, and, responsive to determining that the one or more of the number or the density of the carrier devices in the one or more zones exceeds the threshold, the system controller is configured to one or more of (a) reduce the one or more of the number or the density of the carrier devices in the one or more zones to no more than the threshold of the one or more zones by directing the carrier devices to move or (b) change which task is performed by one or more of the task stations of the packing system.

2. The load balancing system of claim 1, wherein boundaries of the zones are associated with the route communication devices.

3. The load balancing system of claim 1, wherein the system controller is configured to identify the locations of the carrier devices in the packing system based on the communications that include identifications of the carrier devices.

4. The load balancing system of claim 1, wherein the system controller is configured to track ages of the carrier devices in the one or more zones and, responsive to the age of one or more of the carrier devices exceeding an age threshold, the system controller is configured to one or more of direct at least one of the carrier devices to move to another zone of the zones or change the task performed by one or more of the task stations.

5. The load balancing system of claim 1, wherein the zones represent non-overlapping segments of the different segments of the routes.

6. The load balancing system of claim 1, wherein the route communication devices are associated with boundaries of the zones.

7. The load balancing system of claim 6, wherein the route communication devices are not located within the boundaries of at least one of the zones.

8. The load balancing system of claim 1, wherein the route communication devices are configured to optically receive identifications of the carrier devices, and the system controller is configured to identify the locations of the carrier devices based on the identifications of the carrier devices that are optically received by the route communication devices.

9. The load balancing system of claim 1, wherein the system controller is configured to track ages of the carrier devices in the one or more zones, and the system controller is configured to one or more direct at least one of the carrier devices to move to another zone of the zones or change the task performed by one or more of the task stations responsive to the age of one or more of the carrier devices exceeding an age threshold.

10. The load balancing system of claim 1, wherein the system controller is configured to determine whether the number of the carrier devices in the one or more zones exceeds the threshold associated with the one or more zones.

11. The load balancing system of claim 1, wherein the system controller is configured to determine whether the density of the carrier devices in the one or more zones exceeds the threshold associated with the one or more zones.

12. The system controller of claim 1, wherein the system controller is configured to reduce the one or more of the number or the density of the carrier devices in the one or more zones to no more than the threshold of the one or more zones by directing the carrier devices to move.

13. The system controller of claim 1, wherein the system controller is configured to change which task is performed by the one or more task stations of the packing system.

14. The system controller of claim 1, wherein the task stations include one or more automatic task stations configured to automatically perform one or more first tasks of the tasks.

15. The system controller of claim 14, wherein the task stations include one or more manual task stations where one or more second tasks of the tasks are manually performed.

16. The system controller of claim 1, wherein the task stations are configured to perform the tasks that include picking and placing packaging into containers, quality review of the products placed into the containers, and correcting the products or the packaging placed into one or more of the containers.

17. The system controller of claim 1, wherein the carrier devices include motors configured to propel the carrier devices.

18. The system controller of claim 1, wherein the route communication devices are configured to optically communicate with the carrier devices so that each of the route communication devices communicates with only one of the carrier devices at a time.

19. The system controller of claim 1, wherein the task stations are connected to the tracks by on-ramps and off-ramps, and further comprising:
switches disposed at intersections between the tracks and the off-ramps, the switches configured to be controlled by the system controller to alternate between an incoming state to direct the carrier devices to the task stations via the off-ramps and a bypass state to direct the carrier devices to bypass the task stations.

20. The system controller of claim 19, wherein the switches are configured to be controlled by the system controller to change to an outbound state to direct the carrier devices to the tracks via the on-ramps.

* * * * *